United States Patent [19]
Clarisse

[11] 3,820,021
[45] June 25, 1974

[54] SYSTEM FOR DETERMINING THE PRESENCE OF A GIVEN FREQUENCY IN AN INCOMING SIGNAL

[75] Inventor: Christian Clarisse, Bailly, France

[73] Assignee: Electronique Marcel Dassault, Paris, France

[22] Filed: Apr. 9, 1973

[21] Appl. No.: 349,525

[30] Foreign Application Priority Data
Apr. 11, 1972 France .............................. 72.12651

[52] U.S. Cl. ............................ 324/78 Q, 324/79 D
[51] Int. Cl. ....................... G01r 23/02, G01r 23/14
[58] Field of Search ............. 324/78 Q, 78 D, 79 D; 328/138; 340/253 Y

[56] References Cited
UNITED STATES PATENTS
3,571,760  3/1971  Schwartz .......................... 324/78 Q Primary Examiner—Alfred E. Smith
Attorney, Agent, or Firm—Karl F. Ross; Herbert Dubno

[57] ABSTRACT

An incoming signal wave, to be tested for the presence of a component of a predetermined frequency $F_0$, is converted into a square wave fed in parallel to a pair of "exclusive-OR" gates each also receiving a reference square wave of frequency $F_0$, the two reference waves being in quadrature with each other. The output of each gate is applied in noninverted form to a forward-counting input and in inverted form to a backward-counting input of a respective pulse counter stepped by clock pulses of a recurrence frequency substantially higher than $F_0$. The counts of both counters, converted to absolute values, are combined in an adder whose reading reaches a predetermined finite threshold value, starting from zero, only if there is substantial equality between the signal frequency and the reference frequency; in the absence of such equality, the random coincidences and noncoincidences of the compared square waves cancel each other in each counter.

9 Claims, 1 Drawing Figure

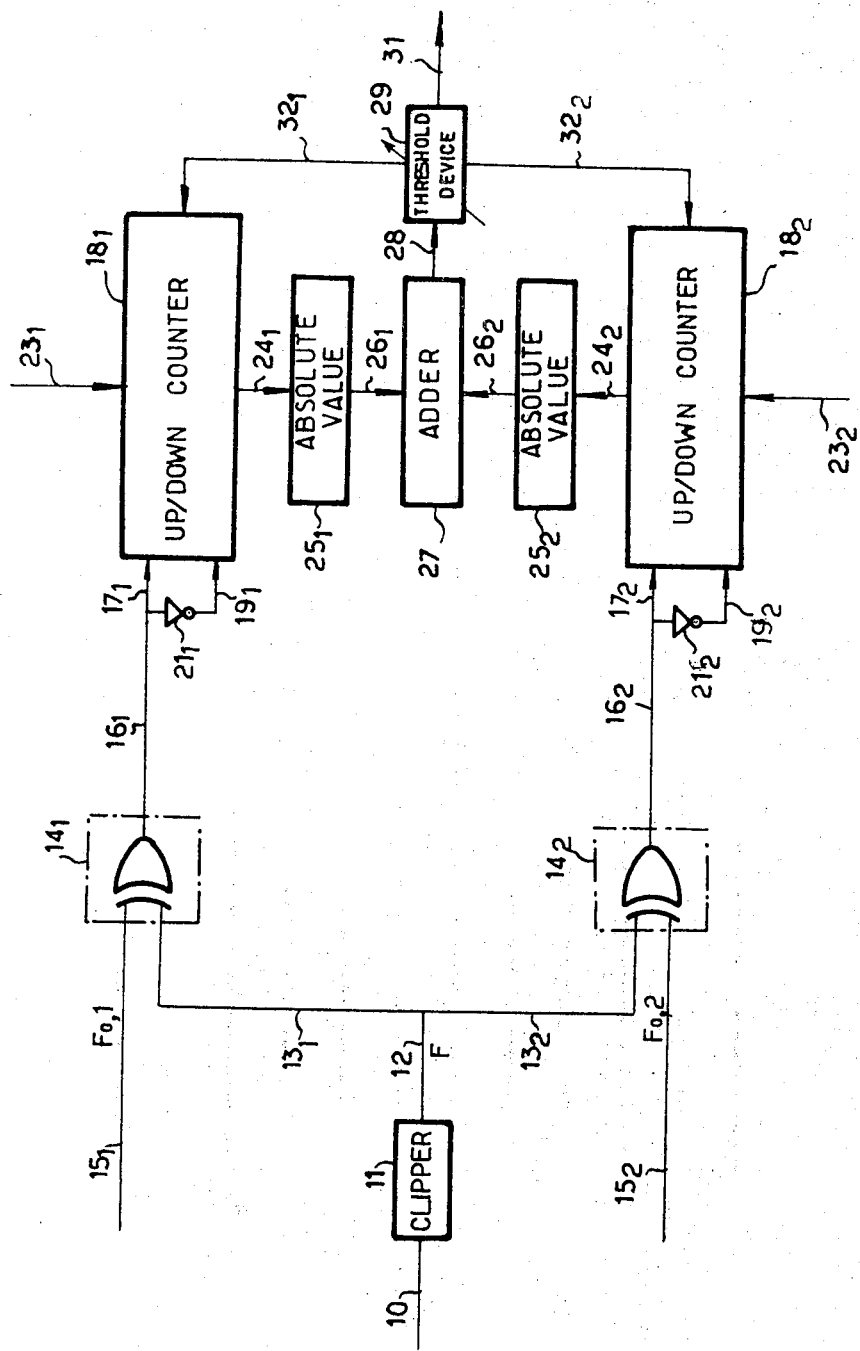

SYSTEM FOR DETERMINING THE PRESENCE OF A GIVEN FREQUENCY IN AN INCOMING SIGNAL

Frequency-detecting devices usually include a band-pass filter comprising a resonant circuit, with a resistor, an inductor and a capacitor, which transmits or blocks an incoming frequency depending on whether that frequency is or is not contained within a frequency band of greater or lesser width known as the filter bandwidth.

Band-pass filters are relatively bulky and it is difficult to insert them into electronic networks using integrated circuits.

The frequency-detection system according to the invention, instead of being of the analog type like conventional band-pass filters, is of the digital type and can thus be considered as a digital filter.

My improved frequency detector includes reversible counting means triggered by a train of clock pulses to count forward or backward according to the difference between the input-signal frequency and a reference frequency as determined by a logical coincidence (or anti-coincidence) circuit, specifically a gate of the "exclusive-OR" type. When this difference remains small for a predetermined length of time, a threshold is reached and the deter emits an output pulse.

In the following description, reference is made to the attached drawing the sole FIGURE of which is a block diagram of a system embodying my invention.

An input signal having a frequency F to be detected as applied to an input lead 10 of a system designed to indicate whether or not the incoming signal or a component thereof is of a frequency, substantially equal to a predetermined reference frequency $F_0$.

Lead 10 feeds a clipper 11 so that the upper and lower amplitudes of the signal can, after clipping, be considered as binary values "1" and "0", respectively. The output lead 12 of clipper 11 is divided into two branches $13_1$ and $13_2$. Branch $13_1$ is the first input of a first "exclusive-OR" gate $14_1$ whose second input $15_1$ receives a square-wave signal $F_{0,1}$ of reference a frequency $F_0$. Branch $13_2$ is the first input of a second "exclusive-OR" gate $14_2$ whose second input receives a square-wave signal $F_{0,2}$ of the same reference frequency but shifted in phase by $\pi/2$ with respect to wave $F_{0,1}$ so that the two reference waves are in quadrature with each other.

The "exclusive-OR" circuits $14_1$ and $14_2$ have an output whenever there is anticoincidence between the incoming square wave from clipper 11 and the reference signals applied respectively to inputs $15_1$ to $15_2$.

The output lead $16_1$ of the "exclusive-OR" gate $14_1$, which is "1" only when a "1" is present at a single one of its inputs $13_1$ and $15_1$, is split into a first branch $17_1$ which constitutes a forward counting input and a second branch $19_1$ constituting a backward counting input of a first up/down counter $18_1$. Clock pulses, with a frequency substantially greater than reference frequency $F_0$, (advantageously at least ten times greater than the latter frequency), are applied to another input $23_1$ of up/down counter $18_1$.

Similarly, output $16_2$ of the "exclusive-OR" gate $14_2$ is split into a first input $17_2$ for forward counting, and a second input $22_2$, for backward counting, of a second up/down counter $18_2$ having another input $23_2$ to which are applied the same clock pulses as those which step the first up/down counter $18_1$. Inputs $19_1$ and $19_2$ include respective inverters $21_1$, $21_2$.

Whan a "1" is present at output $16_1$ of "exclusive-OR" gate $14_1$, unit $18_1$ counts up the clock pulses applied thereto through input $23_1$. When a "0" is present at output $16_1$, unit $18_1$ counts down the clock pulses.

When a "1" is present at output $16_2$ of "exclusive-OR" gate $14_2$, unit $18_2$ counts up the clock pulses applied thereto through input $23_2$. When a "0" is present at output $16_2$, unit $18_2$ counts down the clock pulses.

The result of up and down counting by the reversible counter $18_1$, present in parallel form at its output $24_1$, is applied, as an absolute value supplied by a converter $25_1$, to the first input $26_1$ of an adder 27. The result of up and down counting by reversible counter $18_2$ is read out, as an absolute value supplied by a converter $25_2$, to the second input $26_2$ of adder 27.

When frequency F is equal to frequency $F_0$, the count of each unit $18_1$ and $18_2$ always varies monotonically, i.e. increases or decreases, so that the absolute values delivered by converters $25_1$ and $25_2$ progressively rise. Thus, the number of counted clock pulses rapidly increases at output 28 of the adder. When it reaches a predetermined values, set by a threshold device 29, a signal is transmitted to an output 31 thereof, indicating that the frequency of the signal applied toimput 10 (or of some component thereof) has a value $F_0$.

Pulse-shaping means can be provided at output 31.

As soon as the number of pulses at output 28 of adder 27 reaches the predetermined values, the threshold device 29 transmits a command signal to its outputs $32_1$ and $32_2$ for resetting counters $18_1$ and $18_2$, respectively.

When the signal at input 10 has a frequency different from reference frequency $F_0$, but still sufficiently close thereto, the threshold maystill be reached, but after a slightly longer lapse of time.

Finally, in the case of an input frequency F more remote from frequency $F_0$, the addition result supplied by adder 27 does not reach the value set by the threshold device, so that no signal is transmitted either to output 31 or to outputs $32_1$ and $32_2$.

Since the binary product of two square waves of different frequencies is zero on average, the adder output represents a number which remains substantially constant when the frequency F of the signal is different from $F_0$. On the otherhand, if these two frequencies are equal or close to each other in any phase relationship, owing to the provision of comprises two parallel channels $13_1 - 18_1$ and $13_2 - 18_2$, the adder output represents a number which progressively increases in time.

The bandwidth of the system is determined by the threshold value S and by the frequency $F_H$ of the clock pulses.

It can be varied by adjusting the threshold value of the device 29.

If input frequency F is equal to the reference frequency, $F_0$, then, with the counters initially at O, the threshold is reached after a time lapse T and the bandwidth of the system has a value $\Delta F = 1/T$ It can be shown that the frequencies for which the threshold canbe reached are separated from reference frequency $F_0$ by a value less than or equal to $\Delta F = \% \cdot F_H/S$ The system according to my invention can be provided with continuously operating subtraction means for modifying the rate of increase of the result present at the output 28 of adder 27.

In this case the system may include logic means assuring a first state whenever there is an increase in the number of pulses, which corresponds to the coincidence of the input and reference frequencies, and a second state whenever there is a decrease in the number of pulses, which corresponds to noncoincidence. Means may also be provided for holding the pulse count at zero in the decreasing phase.

The pass band of such a system is given by $\Delta F = 5/16 \cdot F_H/S$

The system according to the invention can be made with integrated circuits.

With the aid of 10-flip-flop up/down counters and by the use of conventional integrated circuits, the presence or absence of a frequency of up to 1 MHz can be determined.

The use of the system according to the invention is particularly advantageous in the field of telephone communications. I claim:

1. A system for detecting the presence of a predetermined frequency $F_O$ in an incoming signal, comprising:
   a source of reference square wave of said predetermined frequency $F_O$;
   logical means connected to said source and provided with input means for receiving said signal as an incoming square wave, said logical means generating a first binary output upon coincidence of said incoming and reference square waves and a second binary output upon noncoincidence thereof;
   reversible counting means connected to said logical means for receiving said binary outputs therefrom;
   a supply of clock pulses connected to said counting means for stepping same at a rate substantially higher than said frequency $F_O$ with generation of a forward count in the presence of said first binary output and generation of a backward count in the presence of said second binary output; and
   read-out means for indicating the count of said counting means.

2. A system as defined in claim 1 wherein said read-out means comprises a threshold device emitting an output signal upon attainment of a count of predetermined finite magnitude.

3. A system as defined in claim 2 wherein said counting means is connected to said threshold means for resetting to a zero position by said output signal.

4. A system as defined in claim 2 wherein said threshold device is adjustable to vary said finite magnitude.

5. A system as defined in claim 1, further comprising converter means inserted between said read-out means and said counting means for reading out an aboslute value of said count.

6. A system as defined in claim 5 wherein said counting means comprises a pair of reversible counters, said logical means comprising a pair of gates each working into a respective counter, said gates being connected to said source for receiving said reference wave therefrom with a relative phase difference, said read-out means including an adder for the absolute values of the counts of said counters.

7. A system as defined in claim 6 wherein said phase difference is $\pi/2$.

8. A systemas defined in claim 6 wherein said gates are Exclusive-OR circuits.

9. A system as defined in claim 1 wherein said input means includes a clipper.

* * * * *